US012647320B2

(12) United States Patent
Xiong

(10) Patent No.: US 12,647,320 B2
(45) Date of Patent: Jun. 2, 2026

(54) DISTRIBUTED NETWORK CONFIGURATION METHOD, INTELLIGENT TERMINAL, AND COMPUTER READABLE STORAGE MEDIUM

(71) Applicant: SHENZHEN TCL NEW TECHNOLOGY CO., LTD., Shenzhen (CN)

(72) Inventor: Fangzhou Xiong, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 187 days.

(21) Appl. No.: 18/252,535

(22) PCT Filed: Nov. 8, 2021

(86) PCT No.: PCT/CN2021/129370
§ 371 (c)(1),
(2) Date: May 11, 2023

(87) PCT Pub. No.: WO2022/100552
PCT Pub. Date: May 19, 2022

(65) Prior Publication Data
US 2024/0022474 A1     Jan. 18, 2024

(30) Foreign Application Priority Data

Nov. 11, 2020    (CN) .......................... 202011254460.9

(51) Int. Cl.
*H04L 41/0893* (2022.01)
*H04L 41/0803* (2022.01)
(52) U.S. Cl.
CPC ...... *H04L 41/0893* (2013.01); *H04L 41/0803* (2013.01)

(58) Field of Classification Search
None
See application file for complete search history.

(56) References Cited

U.S. PATENT DOCUMENTS

2014/0230015 A1* 8/2014 Pollock ............ H04N 21/43615
726/3
2017/0374006 A1* 12/2017 Costenaro .............. H04L 69/02
(Continued)

FOREIGN PATENT DOCUMENTS

CN       106059837 A     10/2016
CN       107071776 A     8/2017
(Continued)

OTHER PUBLICATIONS

International Search Report in International application No. PCT/CN2021/129370,mailed on Jan. 29, 2022.
(Continued)

*Primary Examiner* — Ario Etienne
*Assistant Examiner* — Mohammad Yousuf A. Mian
(74) *Attorney, Agent, or Firm* — PV IP PC; Wei Te Chung

(57) ABSTRACT

Disclosed in the present application are a distributed network configuration method, an intelligent terminal, and a computer readable storage medium. The method includes: receiving device information sent by a cloud server; when a device corresponding to the device information is determined according to the device information as a device to be subjected to network configuration, according to a binding code corresponding to the device, obtaining a distributed interface corresponding to the device and connecting to the interface. According to the present application, because different devices correspond to different binding codes, different distributed interfaces can be determined, so that the efficiency of a cloud server providing services is improved.

11 Claims, 3 Drawing Sheets

(56)         References Cited

U.S. PATENT DOCUMENTS

| | | | | |
|---|---|---|---|---|
| 2018/0270230 A1 * | 9/2018 | Schmidt | .............. | H04L 63/0272 |
| 2019/0289648 A1 | 9/2019 | Kim | | |
| 2020/0169886 A1 * | 5/2020 | Bhatt | ................... | H04W 12/08 |
| 2023/0040580 A1 * | 2/2023 | Yuan | ....................... | H04L 67/12 |

FOREIGN PATENT DOCUMENTS

| | | | | | |
|---|---|---|---|---|---|
| CN | 108173727 | A | | 6/2018 | |
| CN | 108834115 | A | | 11/2018 | |
| CN | 110300117 | A | | 10/2019 | |
| CN | 110809308 | A | * | 2/2020 | |
| CN | 107493212 | B | * | 3/2020 | ......... H04L 12/2807 |
| CN | 110912761 | A | | 3/2020 | |
| CN | 113132185 | A | | 7/2021 | |
| WO | 2018127200 | A1 | | 7/2018 | |
| WO | WO-2023246038 | A1 | * | 12/2023 | |

OTHER PUBLICATIONS

Written Opinion of the International Search Authority in International application No. PCT/CN2021/129370,mailed on Jan. 29, 2022.

Chinese Office Action issued in corresponding Chinese Patent Application No. 202011254460.9 dated Dec. 19, 2022, pp. 1-7.

European Search Report in European application No. 21891077.6, mailed on Sep. 19, 2024.

* cited by examiner

DISTRIBUTED NETWORK CONFIGURATION METHOD, INTELLIGENT TERMINAL, AND COMPUTER READABLE STORAGE MEDIUM

CROSS-REFERENCE TO RELATED APPLICATIONS

This application is a national phase application of PCT Application No. PCT/CN2021/129370 filed Nov. 8, 2021, which claims priority to Chinese Application No. 202011254460.9 filed Nov. 11, 2020 and entitle with "DISTRIBUTED NETWORK CONFIGURATION METHOD AND APPARATUS, INTELLIGENT TERMINAL, AND COMPUTER READABLE STORAGE MEDIUM", the contents of which are incorporated herein by reference in their entirety.

TECHNICAL FIELD

The present application relates to a field of computer technology, and more specifically to a distributed network configuration method, an intelligent terminal, and a computer readable storage medium.

BACKGROUND

The internet of things (IoT) refers to deploying embedded chips and software with perception, computation, and execution into physical objects in a physical world, making things become intelligent things, and at the same time carrying out information transmission and collaborative work by network devices, so as to realize communication between things and things, and people and things. In the present IoT, ways of information interaction include intelligent identification, radio frequency identification (RFID), infrared induction, global positioning, laser scanning and other technologies to achieve. The IoT is based on wireless transmission.

Network configuration systems of the present IoT have many types, such as one-key network configuration, device hotspot network configuration, mobile phone hotspot network configuration, zero-point network configuration, camera scanning code network configuration, etc. However, a current network configuration method based on an intelligent single product is mainly a single network configuration. It needs to rely on a user to determine whether a device is a device to be configured through an intelligent terminal one by one, and then a cloud server performs network configuration. The intelligent terminal can be operated through an interface of the cloud server after the network configuration is completed.

SUMMARY OF THE INVENTION

Technical Problem

Due to needing to deal with the network configuration, user operation management and other work at the same time, the cloud server has high load, low processing efficiency and easy instability.

Technical Solutions

The present application provides a distributed network configuration method, an intelligent terminal, and a computer readable storage medium to solve a problem of low work efficiency after network configuration in the prior art.

In order to realize the above-mentioned purpose, the present application provides a distributed network configuration method. The distributed network configuration method comprises:

receiving device information sent by a cloud server;

when a device corresponding to the device information is determined according to the device information as a device to be configured, obtaining a distributed interface corresponding to the device and connecting to the interface according to a binding code corresponding to the device.

Moreover, in order to realize the above-mentioned purpose, the present application further provides an intelligent terminal. The intelligent terminal comprises a memory, a processor, and a distributed network configuration program stored in the memory and capable of running on the processor. When the distributed network configuration program is executed by the processor, the above steps of the distributed network configuration method are implemented.

Moreover, in order to realize the above-mentioned purpose, the present application further provides a computer readable storage medium. The computer readable storage medium stores a distributed network configuration program. When a processor executes the distributed network configuration program, the above steps of the distributed network configuration method are implemented.

Beneficial Effects

The present application provides a distributed network configuration method. When an intelligent terminal receives device information sent by a cloud server, the intelligent terminal determines whether a device corresponding to the device information is a device to be configured. If so, the intelligent terminal obtains a distributed interface of the cloud server corresponding to the device and connects to the interface according to a binding code corresponding to the device. By a corresponding relationship among the device, the binding code and the distributed interface, after the network configuration is completed, a user processes and sends instructions for different devices through different servers, thus reducing burden of the cloud server after the network configuration and improving work efficiency.

DETAILED DESCRIPTION OF THE EMBODIMENTS

In order to make objectives, technical solutions and advantages of the present application clearer and more certain, the present application will be further described in detail below with reference to the accompanying drawings and embodiments. It should be understood that the specific embodiments described herein are only used to explain the present application, but not to limit the present application.

Figure 1:
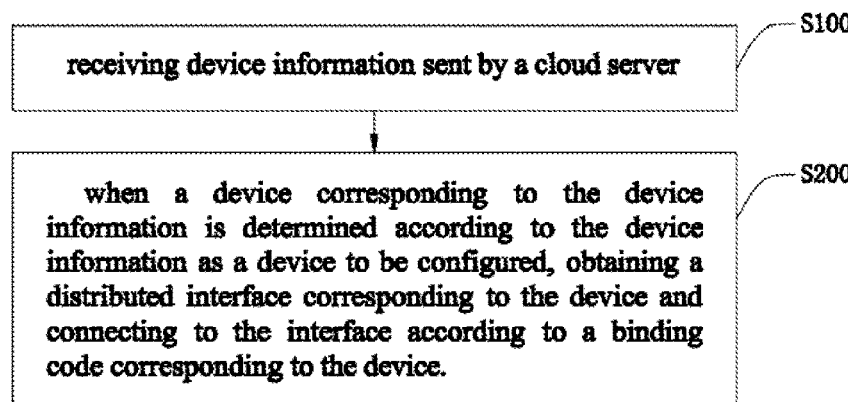
FIG. 1 is a flow chart of a preferred embodiment provided by a distributed network configuration method of the present application.

In order to facilitate the description of an entire distributed network configuration method, a preferred embodiment of the present application takes an intelligent terminal as a main body of an implementation for description. As shown by FIG. 1, the distributed network configuration method includes following steps.

Step S100: the intelligent terminal receiving device information sent by a cloud server.

This embodiment is applied to an automatic network configuration system of an IoT. The system includes equipment, automatic network configuration equipment, a cloud server and an intelligent terminal. Among them, the equipment is an intelligent single product based on an IoT protocol, such as an intelligent refrigerator and an intelligent desk lamp.

In the embodiment, the network configuration system is implemented based on zero-config network configuration. First, a device sends a network configuration request to the automatic network configuration device that has been connected to network. The automatic network configuration device reports existence of the device and the device information to the cloud server. Then the cloud server sends the device information to the intelligent terminal.

In the embodiment, there are two types of the devices. A first is a device that has been connected to the network before. The cloud server can configure the network by default when the cloud server obtains the device information of the device through a router. The device is named as a first device. A second is a device connecting to the network for a first time. A user has not determined whether the device needs network configuration before, so the cloud server needs to obtain a user's feedback before the network configuration, and the device is named as a second device.

In a first implementation, when each device connects to the network for a first time, the automatic network configuration device and/or the cloud server records a unique mark of the device, such as media access control address (MAC address). Therefore, when the automatic network configuration device reports the device information to the cloud server, the cloud server can know that the device is the first device. Wherein, a device to be configured is a device that needs to be configured the network by the network configuration system. Therefore, the cloud server can immediately configure the network for the device, and send the device information to the intelligent terminal.

In a second implementation, because the second device is a device that has never been connected to the network, the user is required to determine whether the device is the device to be configured. Therefore, the cloud server requires the user to determine whether the device is the device to be configured.

Figure 2:
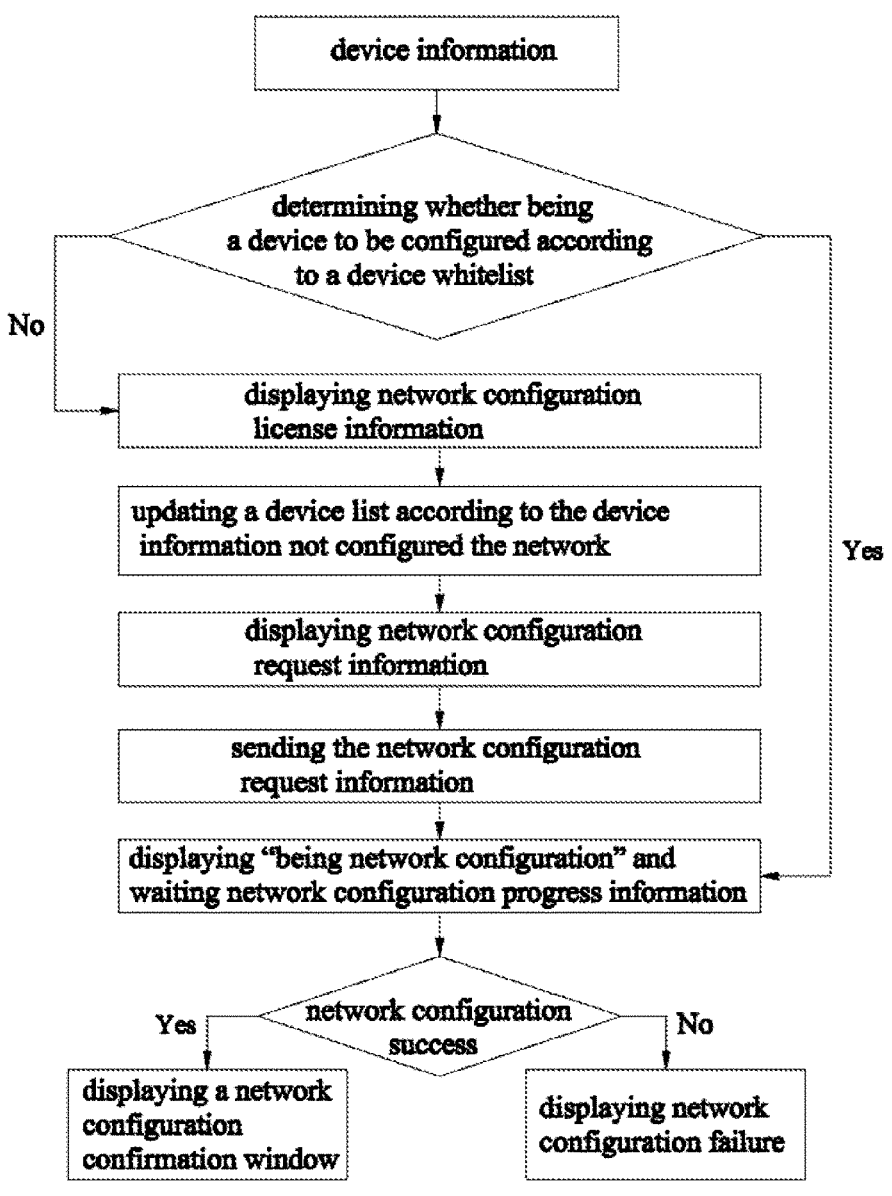
FIG. 2 is a process of determining the device to be configured in the preferred embodiment provided by the distributed network configuration method of the present application.

Further, conventionally, in order to distinguish whether the device information sent by the cloud server is to notify the user that the device is in the network configuration or is to need the user to determine whether it is the device to be configured, the cloud server needs to package the device information and carry a series of identifiers. Referring to FIG. 2, in the embodiment, in order to reduce burden on a front end, a process for the intelligent terminal to determine a purpose of the device information includes:

Matching the device information with a preset device whitelist by the intelligent terminal.

Specifically, every time the user determines whether the device is the device to be configured, the intelligent terminal writes the device information into the device whitelist.

Therefore, after receiving the device information sent by the cloud server, the intelligent terminal matches the device information with the pre-stored device whitelist.

When the matching is successful, the intelligent terminal determines that the device is a default network configuration device, the default network configuration device is a device that has been configured by the cloud server.

Specifically, if it can be successfully matched, it means that the device is the device to be configured. In order to distinguish it from the device to be configured that need to be determined by the user, the device that have been configured before and recorded in the device whitelist is named as the default network configuration devices. Therefore, when the cloud server is now configuring the network for the device, sending the device information is to remind the user that the device is being configured the network. Therefore, a network configuration progress notification corresponding to the device is displayed. For example, when the device is the intelligent desk lamp, the displayed network configuration progress notification is a virtual card similar to "the intelligent desk lamp being in network configuration", and a pattern corresponding to the intelligent desk lamp can be displayed on the virtual card.

When the matching fails, the intelligent terminal performs interactive confirmation according to the device information to determine whether the device is the device to be configured.

Specifically, if the matching fails, it means that the device information sent by the cloud server is to prompt the user to determine whether the device is the device to be configured. Therefore, the intelligent terminal performs the interactive confirmation according to the device information to determine whether the device is the device to be configured. An interactive confirmation method includes displaying a name of the device on a screen, and prompting the user whether to determine that the device is the device to be configured. In the first implementation of the embodiment, prompt information is directly displayed on a display interface, such as "whether to configure the network for the intelligent desk lamp" and so on. After the user determines, the device can be determined as the device to be configured.

Further, in the second implementation of the embodiment, a process of the interactive confirmation includes:

Judging whether the device is a licensed device by the intelligent terminal.

Specifically, the intelligent terminal first judges whether the device is the licensed device according to the device information. Every time the user determines whether the device is the licensed device, the intelligent terminal can write relevant information of the licensed device into a licensed device list. Therefore, after obtaining the device information, the intelligent terminal first determines whether the device is the licensed device according to the device license whitelist.

Further, a process of judging whether the device is the licensed device can also be as follows:

generating and displaying corresponding network configuration license information by the intelligent terminal according to the device information.

when a second confirmation result sent by the user for the network configuration license information is detected, the intelligent terminal judges whether the device is the licensed device according to the second confirmation result.

Specifically, the intelligent terminal first generates the corresponding network configuration license information according to the device information. Taking the intelligent desk lamp as an example, "whether the intelligent desk lamp is the licensed device" is displayed on the display interface, and there are option boxes with similar words "Yes" and "No". For the convenience of user confirmation, the network configuration license information includes an image corresponding to the device. Then the user determines whether the device is the licensed device according to the displayed network configuration license information, selects the corresponding option box, and sends the second confirmation result. Then the intelligent terminal judges whether the device is the licensed device according to the second confirmation result. If the user clicks "Yes", the device is the licensed device; if the user clicks "No", the device is not the licensed device.

If the device is the licensed device, generating and displaying corresponding network configuration confirmation information by the intelligent terminal according to the device information for a user to determine whether the device is a confirmation network configuration device; the confirmation network configuration device is a device that has not undergone network configuration through the cloud server.

Specifically, when the device is determined as the licensed device according to the device information, it means that the user allows the cloud server to configure the network for the device. However, although the user allows the device to be configured the network, he does not intend to configure the network for the device now. For example, when the device requires multiple components to work together, even if the user is now configuring the network for the device, it is useless if the components are not installed. Therefore, it is planned to perform the network configuration and grouping after the components are installed. Therefore, after the device is determined as the licensed device, the user is required to further determine whether the device is a confirmation network configuration device. The confirmation network configuration device is a device that has not undergone the network configuration through the cloud server. Therefore, the corresponding network configuration confirmation information is generated and displayed according to the device information, a form of the network configuration confirmation information can be similar to the above a form of the network configuration license information, except that a displayed text is changed from "license" to "confirm", or displaying prompt words such as "whether to configure the network now", and providing option boxes such as "yes" and "no". The user selects the corresponding option box according to his own needs, thereby sending a first confirmation result.

Moreover, the network configuration confirmation information can be displayed in various ways, such as displaying only an image and a text of the device to be configured, or displaying a name or the image of the device to be configured that has been determined by the user in a form of a long list. The latter is taken as an example for further display description.

The long list is a common method in front-end development. It often occurs that lists cannot be loaded by paging, only the long list can be loaded. In the embodiment, the long list lists devices in the device whitelist and devices corresponding to the device information previously sent by the cloud server. When the cloud server sends the device information of the first device, the intelligent terminal pops up a network configuration confirmation window, and mark "being network configuration" in a row of the first device. When the cloud server sends the device information of the second device, after determining that the second device is the licensed device, the intelligent terminal writes the second device into the long list, and refreshes the network configuration confirmation window, and displays words "network configuration now" and "network configuration later" on a line of the second device for the user to determine whether the device needs to be configured now.

When the first confirmation result sent by the user for the network configuration confirmation information is detected, the intelligent terminal determines whether the device is the confirmation network configuration device according to the first confirmation result.

Specifically, when the first confirmation result sent by the user for the network configuration confirmation information is detected, the intelligent terminal can determine whether the device is the confirmation network configuration device according to the "Yes" or "No" option box corresponding to the first confirmation result. The confirmation network configuration device is a device to be configured that the user needs the cloud server to configure the network, but the cloud server does not configure the network.

Further, in order to help the cloud server configure the network and reduce repeated network configuration of the second device by the cloud server subsequently, after the device is determined as the confirmation network configuration device, the intelligent terminal writes the device information corresponding to the confirmation network configuration device into the device whitelist, and generates corresponding network configuration request information and sends to the cloud server to control the cloud server to perform the network configuration on the device.

Specifically, when the device is the device to be configured, the intelligent terminal needs to inform the cloud server and control the cloud server to configure the network for the device. In the embodiment, a way that the intelligent terminal informs the cloud server is to send the network configuration request information. Wherein, the network configuration request information includes the device information corresponding to the device for the cloud server to determine the device. At the same time, in order to ensure that subsequently the device no longer needs to be subjected to network configuration confirmation subsequently when every time it is configured the network, the device information corresponding to the device is written into a network configuration white list and the preset device whitelist in the cloud server.

It should be noted that in order to reduce amount of data in a transmission process, the device information transmitted between the intelligent terminal and the cloud server can only include a model of the device. However, in order to accurately configure the network, for example, when there are multiple identical intelligent desk lamps in one environment, the transmitted device information can also include a unique identification of each device, such as the above MAC address.

Step S200, when a device corresponding to the device information is determined according to the device information as a device to be configured, the intelligent terminal obtains a distributed interface corresponding to the device and connecting to the interface according to a binding code corresponding to the device.

Specifically, when the device is the device to be configured, the cloud server can configure the network for the device. A purpose of configuring the network is to connect the intelligent terminal and the device through the network.

In the embodiment, when each device is determined as the device to be configured, the cloud server can generate the corresponding binding code and send it to the intelligent terminal. Subsequently, each intelligent terminal can call the corresponding distributed interface on the cloud server through the binding code. A preferred form of the distributed interface is an application programming interface (API). Therefore, in the first implementation, when the device is the device to be configured, the intelligent terminal obtains the distributed interface corresponding to the device and connecting to the interface according to the binding code sent by the cloud server in advance, so that when the device is successfully configured to the network, the data can be transmitted according to the distributed interface.

Further, in the embodiment, when the device is the second device, and the intelligent terminal determines the device as the licensed device, the network configuration request information sent by the intelligent terminal to the cloud server includes a binding code request. After the cloud server receives the binding code request, the cloud server can generate the binding code according to the device information of the device. A generation mode can be random generation, device information encryption generation, etc. Moreover, in order to simplify work type of each server in the cloud server and improve efficiency, each server in the cloud server corresponds to a same device type. Therefore, the device information based on which the binding code is generated is the device type. The binding code of the same device type may have a common mark.

Further, after receiving the network configuration request information, the cloud server informs the automatic network configuration equipment to configure the network, and the automatic network configuration equipment sends router's address and password to the device for the device completing the network configuration. After the completes the network configuration, the device informs the cloud server that it has completed the network configuration. Then the cloud server binds the binding code corresponding to the device with a user account, so that the intelligent terminal only needs the binding code when interacting with the cloud server subsequently.

Further, according to the binding code corresponding to the device, the intelligent terminal obtains the distributed interface corresponding to the device and connects to the interface according to the binding code corresponding to the device. The cloud server can send network configuration progress information to the intelligent terminal according to the network configuration of the device. The network configuration progress information includes two types of network configuration success and network configuration failure. When the network configuration progress information is detected, the intelligent terminal generates and displays a network configuration result according to the network configuration progress information.

response failure information is considered that during use, due to an unsmooth network configuration process of the device, an unstable network and other reasons, the intelligent terminal may take a long time to receive the network configuration result of the device sent by the cloud server. And the network configuration result that can be received for the long time implies that network configuration environment of the device may be unstable. Even if the network configuration result sent by the cloud server is the network configuration success, the network may be disconnected during this process or when the user remotely controls the device subsequently. Therefore, in the embodiment, the network configuration progress information further includes the response failure information. The response failure information is the network configuration progress information generated when a detection time for detecting the network configuration progress information is greater than a preset detection time.

A progress of generating the response failure information is as follows:

recording a current moment as a sending moment, when the network configuration request information is sent to the cloud server;

calculating a corresponding detection time in real time according to the sending moment;

judging whether the detection time is greater than a preset time threshold;

generating the response failure information if the detection time is greater than a preset time threshold.

Specifically, when the intelligent terminal sends the network configuration request information, a current moment is recorded as the sending moment. Then, at regular intervals, such as one second, a current moment in real time is obtained as the detection moment, and a difference value between the detection moment and the sending moment is calculated as the detection time. Finally, the detection time is compared with the preset time threshold. If the detection time is greater than a preset time threshold, it means that the cloud server has been configured the network to the device for a long time, so the response failure information is generated. After the intelligent terminal detects the response failure information, it can know that the cloud server is not successful in the network configuration of the device, so the intelligent terminal displays a network configuration failure result of the network configuration result to prompt the user that the device failed to be configured. If the cloud server sends a device progress result in time, the intelligent terminal determines whether the device is successfully configured the network according to the device progress result. If success, a network configuration success result of the network configuration result is displayed; If failure, the network configuration failure result of the network configuration result is displayed.

During actual operation, interface information may change. For example, hardware or software of the cloud server is upgraded and maintained. Therefore, in the embodiment, in order to take into account of the change of the interface information, when the interface information changes, refer to FIG. 3, following steps can be performed:

When interface change information sent by the cloud server is detected, the intelligent terminal sends an event detail request to the cloud server according to a preset user account.

In the embodiment, when a server in the cloud server needs to change the interface, the interface change information is sent to the intelligent terminal. Wherein, the interface change information refers to a notification that the interface has changed. When the intelligent terminal detects the interface change information, the intelligent terminal writes a user account into a request connection with the preset user account, and generates the event detail request to send it to the cloud server. The cloud server finds the corresponding binding code according to a registered account, then determines the server related to the user and whose interface has changed according to the distributed interface information corresponding to the binding code, and then sends updated interface address and other information of the server and the binding code related to the server as event detail information to the intelligent terminal.

When the event detail information sent by the cloud server according to the event detail request is detected, the intelligent terminal analyzes the event detail information to generate update interface information.

Specifically, when the event detail information is detected, the intelligent terminal analyzes the event detail information to generate the update interface information. Wherein, the update interface information includes the device information corresponding to the device where the interface of the server changes, such as the binding code, the MAC address, the model, etc.

The intelligent terminal updates the network configuration confirmation information according to the update interface information to generate and display update confirmation information.

Specifically, because the distributed interface of the server changes, there may be errors when the user sends instructions to the cloud server subsequently. When the interface of the server changes before the user confirms the device to be configured, the intelligent terminal needs to update the displayed network configuration confirmation information to ensure that data entered by the user can be accurately sent to the server. Therefore, according the update interface information, the intelligent terminal updates network configuration information to generate the update confirmation information. When subsequently the device to be configured needs to be determined, the intelligent terminal displays the update confirmation information obtained after updating.

Further, in the embodiment, the network configuration confirmation information is displayed by the network configuration confirmation window. In general, if the network configuration confirmation window has been displayed in the display interface, a displayed content is not updated. After the user determines the device, the intelligent terminal can convert an original corresponding interface information to an updated interface information in the background. In this process, there is a gap between the displayed content and a real content. Therefore, in order to improve the accuracy of the displayed content, in the embodiment, the step of generating and displaying the update confirmation information is as follows.

The intelligent terminal updates the network configuration confirmation information according to the update interface information to generate the update confirmation information.

The embodiment takes updating the network configuration confirmation information in a form of a long list as an example. According to the update interface information, the interface information corresponding to the device whose the server has changed in the long list in source code is modified to generate the update confirmation information.

When the network configuration confirmation window of displaying the network configuration confirmation information is loaded on the display interface, the intelligent terminal refreshes the network configuration confirmation window according to the update confirmation information.

Specifically, in the first implementation of the embodiment, the display interface of the intelligent terminal has loaded the network configuration confirmation window of the network configuration confirmation information.

When the network configuration confirmation window is not loaded on the display interface, the intelligent terminal loads the network configuration confirmation window, renders and outputs the update confirmation information.

Specifically, in the second implementation of the embodiment, the display interface of the intelligent terminal has no the network configuration confirmation window. If the intelligent terminal updates itself subsequently and does not inform the user in time, instructions sent by the user are still sent according to the old distributed interface, which may cause sending failure. Therefore, the intelligent terminal will render and output the update confirmation information to the network configuration confirmation window, and load the network configuration confirmation window.

Figures 3, 4:
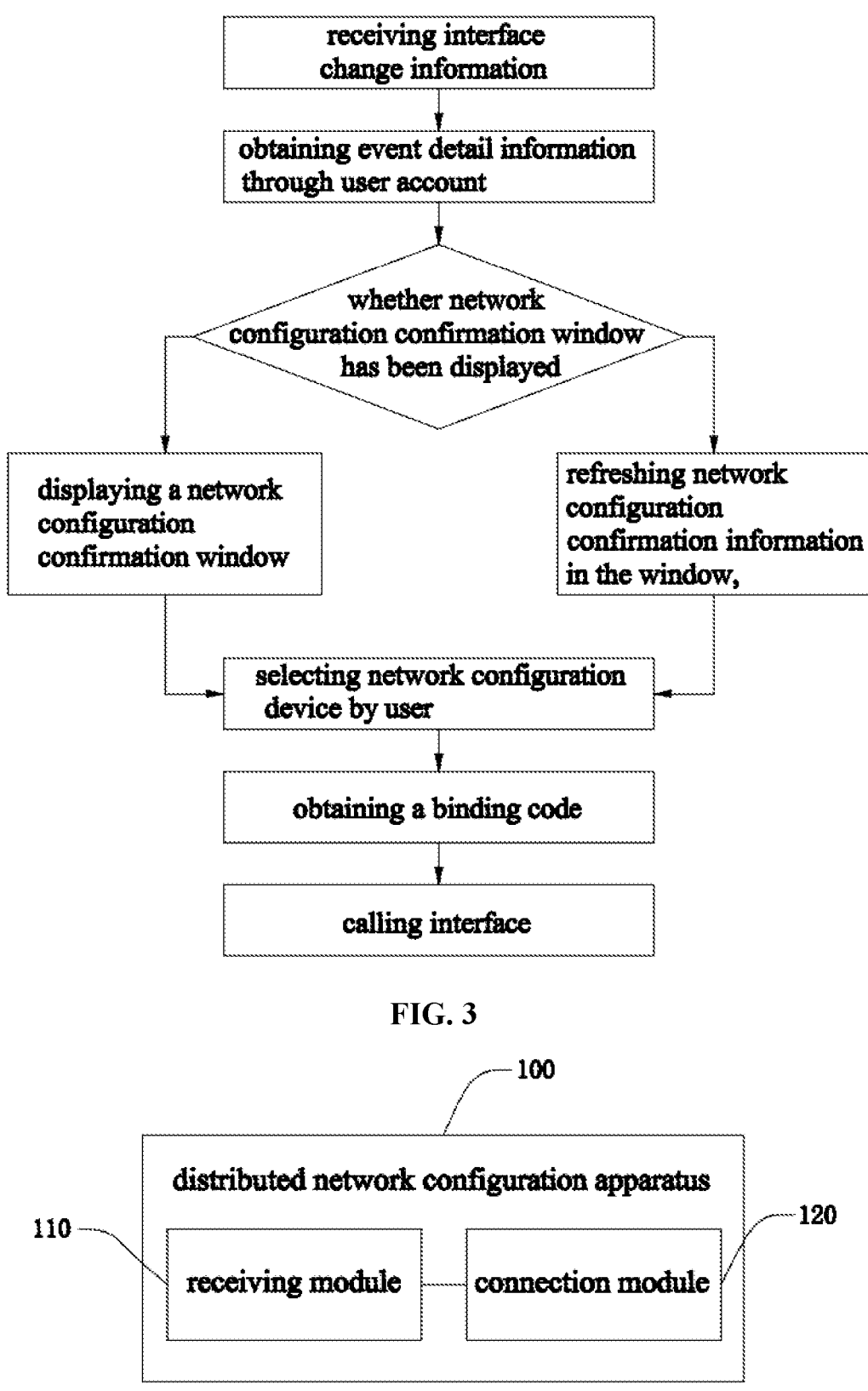
FIG. 3 is a flow chart of changing an interface in the preferred embodiment provided by the distributed network configuration method of the present application.
FIG. 4 is a schematic view of a preferred embodiment provided by a distributed network configuration apparatus of the present application.

Further, referring to FIG. 4, based on the above distributed network configuration method, the present application further provides a distributed network configuration apparatus 100. The apparatus includes:

a receiving module 110 for receiving device information sent by a cloud server; and a connection module 120 for, when a device corresponding to the device information is determined according to the device information as a device to be configured, obtaining a distributed interface corresponding to the device and connecting to the interface according to a binding code corresponding to the device.

Wherein the distributed network configuration apparatus 100 further includes a confirmation module. The confirmation module includes:

a matching unit for matching the device information with a preset device whitelist; and a processing unit for, when the matching is successful, determining that the device is a default network configuration device; the default network configuration device is a device that was once configured by the cloud server; or when the matching fails, performing interactive confirmation according to the device information to determine whether the device is the device to be configured.

Wherein, the processing unit includes:

a judgment subunit for determining whether the device is a licensed device;

a display subunit for, if the device is the licensed device, generating and displaying corresponding network configuration confirmation information according to the device information for a user to determine whether the device is a confirmation network configuration device; the confirmation network configuration device is a device that has not undergone network configuration through the cloud server;

a confirmation subunit for, when a first confirmation result sent by the user for the network configuration confirmation information is detected, determining whether the device is the confirmation network configuration device according to the first confirmation result.

The distributed network configuration apparatus 100 further includes a network configuration request module. The network configuration request module is specifically used for:

writing the device information corresponding to the confirmation network configuration device into the device whitelist, and generating corresponding network configuration request information and sending to the cloud server to control the cloud server to perform the network configuration on the device; the network configuration request information includes a binding code request, the binding code request is used to obtain the binding code corresponding to the device.

The distributed network configuration apparatus 100 further includes a network configuration progress module. The network configuration progress module is specifically used for:

when the network configuration progress information is detected, generating and displaying a network configuration result according to the network configuration progress information; the network configuration progress information includes device progress information and response failure information, the device progress information is the network configuration progress information generated after the cloud server performs network configuration on the device, and the response failure information is the network configuration progress information generated when a detection time for detecting the network configuration progress information is greater than a preset detection time.

The distributed network configuration apparatus 100 further includes an updating module. The updating module includes:

a request unit for, when interface change information sent by the cloud server is detected, sending an event detail request to the cloud server according to a preset user account;

an analysis unit for, when event detail information sent by the cloud server according to the event detail request is detected, analyzing the event detail information to generate update interface information; and an updating unit for updating the network configuration confirmation information according to the update interface information to generate update confirmation information, and displaying the update confirmation information.

Wherein, the updating unit further includes:

an updating subunit for updating the network configuration confirmation information according to the update interface information to generate the update confirmation information;

a first display subunit for, when a network configuration confirmation window is loaded on a display interface, refreshing the network configuration confirmation window according to the update confirmation information; the network configuration confirmation window is a window for displaying the network configuration confirmation information; or a second display subunit for, when the network configuration confirmation window is not loaded on the display interface, loading the network configuration confirmation window, rendering and outputting the update confirmation information.

Figure 5:
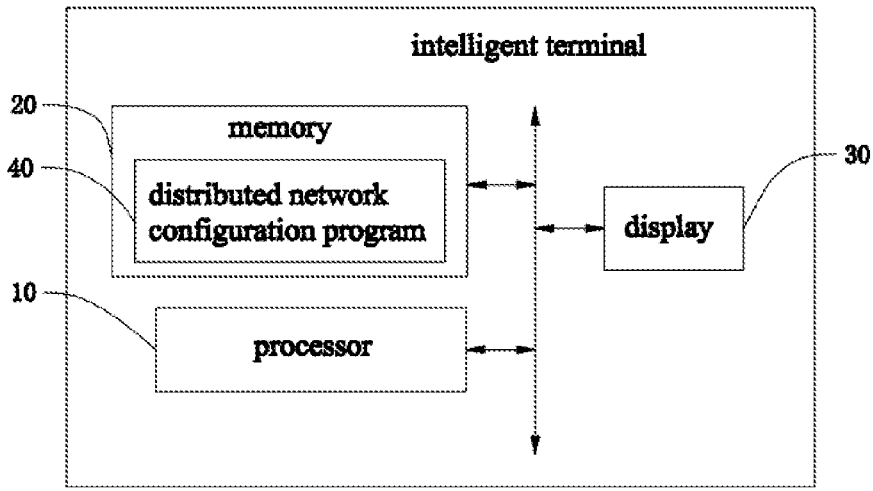
FIG. 5 is a schematic view of an operating environment of a preferred embodiment of an intelligent terminal of the present application.

Further, referring to FIG. 5, based on the above distributed network configuration method, the present application further provides an intelligent terminal. The intelligent terminal includes a processor 10, a memory 20, and a display 30. FIG. 5 only shows some components of the intelligent terminal, but it should be understood that it is not required to implement all the components shown, and more or fewer components can be implemented instead.

In some embodiments, the memory 20 may be an internal storage unit of the intelligent terminal, such as a hard disk or internal storage of the intelligent terminal. In other embodiments, the memory 20 may also be an external storage device of the intelligent terminal, such as a plug-in hard disk equipped on the intelligent terminal, a smart media card (SMC), a secure digital (SD) card, a flash card, etc. Further, the memory 20 may also comprise both an internal storage unit of the intelligent terminal and the external storage device. The memory 20 is used to store application software installed in the intelligent terminal and various types of data, such as program code installed in intelligent terminal, etc. The memory 20 can also be used to temporarily store data that has been output or will be output. In one embodiment, a distributed network configuration program

40 is stored in the memory 20, and the distributed network configuration program 40 can be executed by the processor 10, so as to implement the distributed network configuration method in the present application.

The processor 10 in some embodiments may be a central processing unit (CPU), a microprocessor or other data processing chips, for running the program code or processing the data stored in the memory 20, such as executing the distributed network configuration method and the like.

In some embodiments, the display 30 may be an LED display, a liquid crystal display, a touch control liquid crystal display, an OLED (organic light-emitting diode) touch device and the like. The display 30 is used for displaying information on an intelligent terminal and for displaying a visualized user interface. The components 10-30 of the intelligent terminal communicate with each other via a system bus.

In one embodiment, when the processor 10 executes the distributed network configuration program 40 in the memory 20, the processor 10 implements following steps:

receiving device information sent by a cloud server; and when a device corresponding to the device information is determined according to the device information as a device to be configured, obtaining a distributed interface corresponding to the device and connecting to the interface according to a binding code corresponding to the device.

Wherein, after receiving device information sent by a cloud server, the method also includes:

matching the device information with a preset device whitelist;

when the matching is successful, determining that the device is a default network configuration device; the default network configuration device is a device that was once configured by the cloud server; or when the matching fails, performing interactive confirmation according to the device information to determine whether the device is the device to be configured.

Wherein, performing interactive confirmation according to the device information to determine whether the device is the device to be configured, includes:

judging whether the device is a licensed device;

if the device is the licensed device, generating and displaying corresponding network configuration confirmation information according to the device information for a user to determine whether the device is a confirmation network configuration device; the confirmation network configuration device is a device that has not undergone network configuration through the cloud server;

when a first confirmation result sent by the user for the network configuration confirmation information is detected, determining whether the device is the confirmation network configuration device according to the first confirmation result;

when the device is the device to be configured, generating corresponding network configuration request information and sending to the cloud server to control the cloud server to perform the network configuration on the device.

Wherein, judging whether the device is a licensed device, includes:

generating and displaying corresponding network configuration license information according to the device information;

when a second confirmation result sent by the user for the network configuration license information is detected, judging whether the device is the licensed device according to the second confirmation result.

Wherein, after determining whether the device is the confirmation network configuration device according to the first confirmation result, the method further includes:

writing the device information corresponding to the confirmation network configuration device into the device whitelist, and generating corresponding network configuration request information and sending to the cloud server to control the cloud server to perform the network configuration on the device; the network configuration request information includes a binding code request, the binding code request is used to obtain the binding code corresponding to the device.

Wherein, after obtaining a distributed interface corresponding to the device and connecting to the interface according to the binding code corresponding to the device, the method further includes:

when network configuration progress information is detected, generating and displaying a network configuration result according to the network configuration progress information; the network configuration progress information includes device progress information and response failure information, the device progress information is the network configuration progress information generated after the cloud server performs network configuration on the device, and the response failure information is the network configuration progress information generated when a detection time for detecting the network configuration progress information is greater than a preset detection time.

the method further includes:

when interface change information sent by the cloud server is detected, sending an event detail request to the cloud server according to a preset user account;

when event detail information sent by the cloud server according to the event detail request is detected, analyzing the event detail information to generate update interface information;

updating the network configuration confirmation information according to the update interface information to generate update confirmation information, and displaying the update confirmation information.

Wherein, displaying the update confirmation information, includes:

when a network configuration confirmation window is loaded on a display interface, refreshing the network configuration confirmation window according to the update confirmation information; the network configuration confirmation window is a window for displaying the network configuration confirmation information; or when the network configuration confirmation window is not loaded on the display interface, loading the network configuration confirmation window, rendering and outputting the update confirmation information.

The present application also provides a computer readable storage medium. The computer readable storage medium stores a distributed network configuration program. When the distributed network configuration program is executed by a processor, the above steps of the distributed network configuration method can be implemented.

Certainly, the ordinary skill in the art can understand that all or part of the processes in the above-mentioned embodiment methods can be implemented by instructing relevant hardware (such as a processor, a controller, etc.) through a computer program, and the program can be stored in a computer readable storage medium, and the program can include a flow as described in the embodiment of each method. The storage medium can be a memory, a magnetic disc, an optical disc, etc.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A distributed network configuration method, comprising: receiving device information sent by a cloud server;

when a device corresponding to the device information is determined according to the device information as a device to be configured, determining an interface corresponding to the device and connecting to the interface according to a binding code corresponding to the device;

determining whether the device is a confirmation network configuration device to be configured according to a first confirmation result;

wherein after determining whether the device to be configured is the confirmation network configuration device, the confirmation network configuration device being the device to be configured that is confirmed according to the first confirmation result, the method further comprises:

writing the device information corresponding to the confirmation network configuration device into a device whitelist, and generating corresponding network configuration request information and sending the network configuration request information to the cloud server, such that the cloud server performs network configuration on the device; the network configuration request information comprises a binding code request, and the binding code request is used to obtain the binding code corresponding to the device;

wherein the device information carries an identifier, wherein the identifier is used to distinguish whether the device information sent by the cloud server is for notifying a user that the device is currently undergoing network configuration or for prompting the user to confirm whether the device is the device to be configured; and wherein each server in the cloud server corresponds to a same device type, the binding code is generated based on the device information corresponding to the device type, and binding codes of the same device type share a common identifier.

2. The method according to claim 1, wherein after said receiving device information sent by a cloud server, the method further comprises:

matching the device information with a preset device whitelist;

when the matching is successful, determining that the device is a default network configuration device; the default network configuration device is a device that has been configured by the cloud server, or when the matching fails, performing interactive confirmation according to the device information to determine whether the device is the device to be configured.

3. The method according to claim 2, wherein said performing interactive confirmation according to the device information to determine whether the device is the device to be configured, comprises:

judging whether the device is a licensed device;

if the device is the licensed device, generating and displaying corresponding network configuration confirmation information according to the device information for a user to determine whether the device is a confirmation network configuration device; the confirmation network configuration device is a device that has not undergone network configuration through the cloud server;

when the first confirmation result sent by the user for the network configuration confirmation information is detected, determining whether the device is the confirmation network configuration device according to the first confirmation result.

4. The method according to claim 3, wherein said judging whether the device is a licensed device, comprises:

generating and displaying corresponding network configuration license information according to the device information;

when a second confirmation result sent by the user for the network configuration license information is detected, judging whether the device is the licensed device according to the second confirmation result.

5. The method according to claim 1, wherein after said determining an interface corresponding to the device and connecting to the interface, the method further comprises:

when network configuration progress information is detected, generating and displaying a network configuration result according to the network configuration progress information; the network configuration progress information comprises device progress information and response failure information, the device progress information is the network configuration progress information generated after the cloud server performs network configuration on the device, and the response failure information is the network configuration progress information generated when a detection time for detecting the network configuration progress information is greater than a preset detection time.

6. The method according to claim 3, wherein the method further comprises:

when interface change information sent by the cloud server is detected, sending an event detail request to the cloud server according to a preset user account;

when event detail information sent by the cloud server according to the event detail request is detected, analyzing the event detail information to generate update interface information;

updating the network configuration confirmation information according to the update interface information to generate update confirmation information, and displaying the update confirmation information.

7. The method according to claim 6, wherein said displaying the update confirmation information, comprises:

when a network configuration confirmation window is loaded on a display interface, refreshing the network configuration confirmation window according to the update confirmation information; the network configuration confirmation window is a window for displaying the network configuration confirmation information; or when the network configuration confirmation window is not loaded on the display interface, loading the network configuration confirmation window, rendering and outputting the update confirmation information.

8. An intelligent terminal, comprising a memory, a processor, and a distributed network configuration program stored in the memory and capable of running on the processor, when the processor executes the distributed network configuration program, the processor implementing:

receiving device information sent by a cloud server; and when a device corresponding to the device information is determined according to the device information as a device to be configured, determining an interface corresponding to the device and connecting to the interface according to a binding code corresponding to the device;

determining whether the device is a confirmation network configuration device to be configured according to a first confirmation result;

wherein after determining whether the device to be configured is the confirmation network configuration device, the confirmation network configuration device being the device to be configured that is confirmed according to the first confirmation result, the processor further implementing:

writing the device information corresponding to the confirmation network configuration device into a device whitelist, and generating corresponding network configuration request information and sending the network configuration request information to the cloud server, such that the cloud server performs network configuration on the device; the network configuration request information comprises a binding code request, and the binding code request is used to obtain the binding code corresponding to the device;

wherein the device information carries an identifier, wherein the identifier is used to distinguish whether the device information sent by the cloud server is for notifying a user that the device is currently undergoing network configuration or for prompting the user to confirm whether the device is the device to be configured; and wherein each server in the cloud server corresponds to a same device type, the binding code is generated based on the device information corresponding to the device type, and binding codes of the same device type share a common identifier.

9. The intelligent terminal according to claim 8, wherein after said receiving device information sent by a cloud server, the processor further implements:

matching the device information with a preset device whitelist;

when the matching is successful, determining that the device is a default network configuration device; the default network configuration device is a device that was once configured by the cloud server; or when the matching fails, performing interactive confirmation according to the device information to determine whether the device is the device to be configured.

10. The intelligent terminal according to claim 9, wherein when implementing said performing interactive confirmation according to the device information to determine whether the device is the device to be configured, the processor implements:

judging whether the device is a licensed device;

if the device is the licensed device, generating and displaying corresponding network configuration confirmation information according to the device information for a user to determine whether the device is a confirmation network configuration device; the confirmation network configuration device is a device that has not undergone network configuration through the cloud server;

when the first confirmation result sent by the user for the network configuration confirmation information is detected, determining whether the device is the confirmation network configuration device according to the first confirmation result;

when the device is the device to be configured, generating corresponding network configuration request information and sending to the cloud server to control the cloud server to perform the network configuration on the device.

11. The intelligent terminal according to claim 10, wherein when implementing said judging whether the device is a licensed device, the processor implements:

generating and displaying corresponding network configuration license information according to the device information;

when a second confirmation result sent by the user for the network configuration license information is detected, judging whether the device is the licensed device according to the second confirmation result.

\*  \*  \*  \*  \*